UNITED STATES PATENT OFFICE.

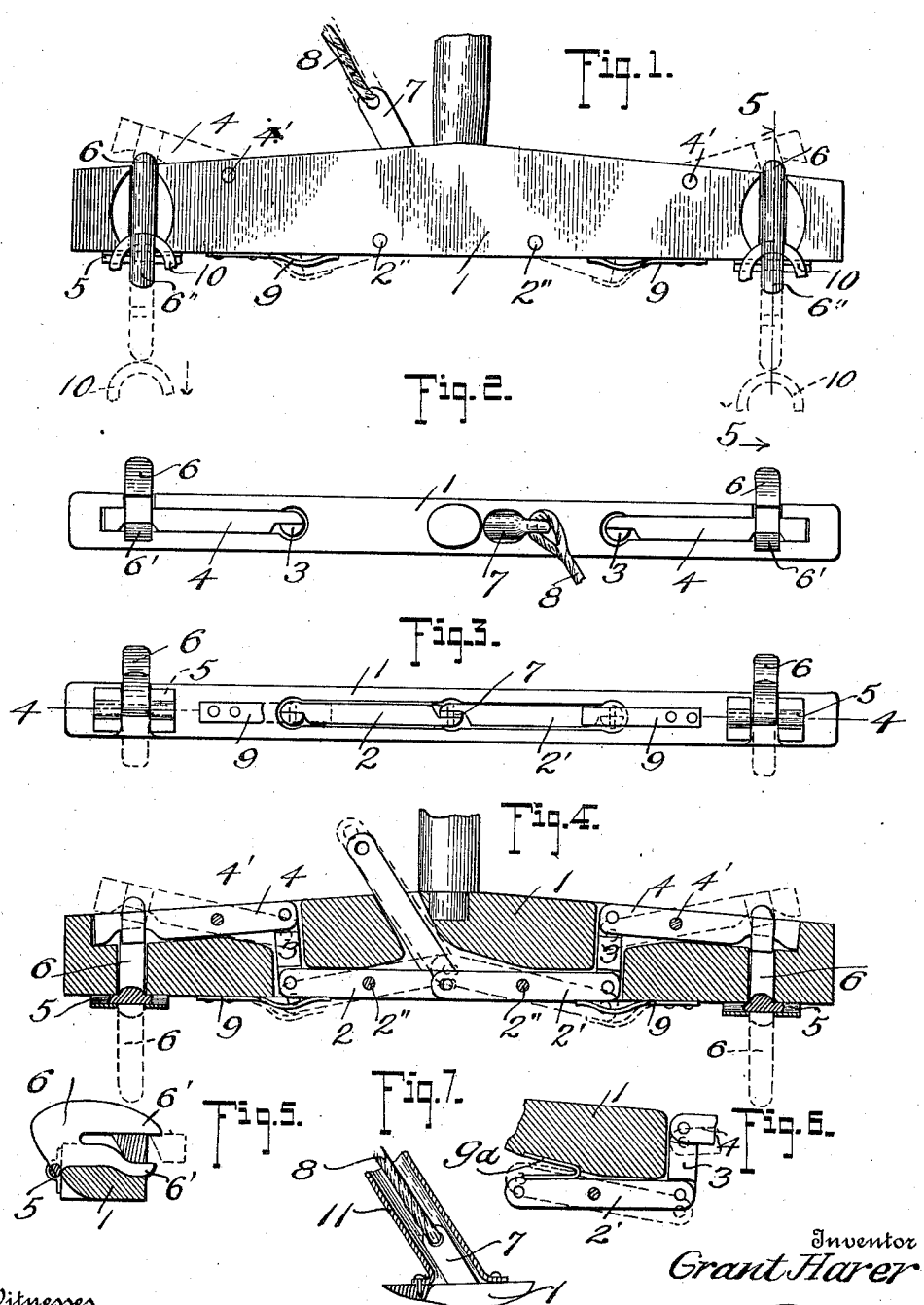

GRANT HARER, OF LONG CREEK, OREGON.

HORSE-DETACHER.

1,038,572.   Specification of Letters Patent.   Patented Sept. 17, 1912.

Application filed March 26, 1912. Serial No. 686,285.

*To all whom it may concern:*

Be it known that I, GRANT HARER, a citizen of the United States, residing at Long Creek, in the county of Grant and State of Oregon, have invented certain new and useful Improvements in Horse-Detachers, of which the following is a specification.

This invention relates to improvements in horse detachers, its primary object being to provide manually operative means for quickly releasing a horse from a vehicle should it become necessary or desirable to do so.

Specifically, my invention comprises novel means operable by an occupant within the vehicle whereby the trace hooks mounted on the swingletree may be released from their normal position to permit the traces to become detached, the hooks, however, under ordinary conditions securely performing their usual draft function.

For a full understanding of the present invention, reference is to be had to the following description and the accompanying drawings, in which—

Figure 1 is a top plan view showing a swingletree embodying my invention; Fig. 2 is a rear elevation; Fig. 3 is a front elevation of the same; Fig. 4 is a horizontal sectional view on the line 4—4 of Fig. 3; Fig. 5 is a transverse section taken about on the line 5—5 of Fig. 1; and Fig. 6 is a partial sectional view showing a modified form of spring for holding the toggle lever in normal position; Fig. 7 is a fragmentary view showing in section a flexible tube which may be used to protect the connecting member.

Throughout the following detail description and on the several figures of the drawings, similar parts are referred to by like reference characters.

While my invention is readily applicable to swingletrees or double bars, I have shown in the drawings the construction of a swingletree, designated as 1, embodying my peculiar form of releasing means. The swingletree is preferably formed with continuous recess extending longitudinally therethrough, as shown most clearly in Fig. 4 of the drawings, and mounted intermediate its ends at the front portion thereof in said recess is the toggle lever 2, comprising the members 2' mounted on the pivots 2''. The opposite ends of the toggle lever 2 are pivotally connected by means of the links 3, with the releasing levers 4, which are in turn mounted adjacent the extremities of the swingletree in the recess aforesaid on the pivots 4'.

Pivotally mounted on the ends of the swingletree 1, as by means of the pintles 5, are the usual trace attaching hooks 6, said hooks comprising upper and lower jaw members 6' between which the outer extremities of the releasing levers 4 are received.

Secured at one end between the joint of the members 2' of the toggle lever 2 is the operating arm 7 extending rearwardly and preferably in an oblique direction, such as toward the driver's seat in the vehicle, and through an opening in the other end of said arm a flexible connecting member or rope 8 is fastened.

On the front portion of the swingletree I provide springs 9 adjacent the opposite ends of the toggle lever 2, the free ends of said springs normally bearing against the outer ends of the members 2'. As will be apparent, the tendency of these springs is to hold the toggle lever in operative position, and the releasing levers 4 in engagement with the trace hooks 6, thereby preventing any likelihood of unauthorized disengagement of said releasing levers from the hooks.

The operation of my device will be clearly understood from the foregoing description and by reference to the drawing. The ends of the traces 10, shown in Fig. 1, are inserted in the usual manner in the hooks 6, and the ends of the releasing levers 4 engaged between the jaw members 6', under which conditions the swingletree will operate as the ordinary draft means, but should the horse for any reason become unruly or unmanageable and likely to endanger the life of the occupant of the vehicle, the driver catches hold of the rope 8 and by giving a quick jerk the toggle lever 2, through its link connections, will disengage the ends of the releasing levers 4 from between the jaw members 6. This will permit the hooks to swing downwardly, thereby detaching the trace ends 10 therefrom.

While I have shown in the drawings the preferred form of spring 9 it is obvious that other forms of springs may be used, such as the bent leaf spring 9ª as shown in Fig. 6, in which case the said spring is placed adjacent the toggle joint within the recess in the swingletree 1. The connecting member 8 may be effectively protected from being accidentally operated by the flexible tube or casing 11, shown in Fig. 7 through which said member passes. The tube is attached to the swingletree and extends backward to a convenient place in front of the driver, where it is also secured. Other changes in the details of construction may readily be made without departing from the spirit of my invention and within the scope of the claims hereto appended.

Having thus described the invention, what is claimed as new is:

1. A horse detacher comprising in combination, a swingletree, a toggle lever mounted on said swingletree intermediate its ends, releasing levers operatively connected at one end with the toggle lever, trace attaching hooks mounted on the ends of said swingletree and normally held in operative position by said releasing levers, and means connected with the toggle lever to disengage the releasing levers aforesaid to release the hooks.

2. A horse detacher comprising in combination, a swingletree, a toggle lever mounted on said swingletree intermediate its ends, releasing levers operatively connected at one end with the toggle lever, trace attaching hooks mounted on the ends of said swingletree and normally held in operative position by said releasing levers, means for holding the releasing levers in engagement with the trace hooks, and means connected with the toggle lever to disengage the releasing levers aforesaid to release the hooks.

3. A horse detacher comprising in combination, a swingletree, a toggle lever mounted on said swingletree intermediate its ends, releasing levers operatively connected at one end with the toggle lever, trace attaching hooks mounted on the ends of said swingletree and normally held in operative position by said releasing levers, and an operating arm connected with the toggle lever and operable to disengage the releasing levers from the hooks aforesaid.

4. A horse detacher comprising in combination, a swingletree having a recess extending longitudinally thereof, a toggle lever mounted in the recess aforesaid and intermediate the ends of said swingletree, releasing levers pivotally mounted intermediate their ends adjacent to each end of the toggle lever, trace attaching hooks mounted on the ends of said swingletree and normally held in operative position by said releasing levers, links connecting the opposite ends of the toggle lever with the releasing levers, an operating arm connected with the toggle lever and operable to disengage the releasing levers from the hooks aforesaid, and springs secured to the swingletree, the free ends of which bear against the toggle levers to hold the releasing levers normally in engagement with the trace hooks.

5. A horse detacher comprising, in combination, a swingletree, a toggle lever mounted on said swingletree intermediate its ends, releasing levers connected at one end with the toggle lever, trace attaching hooks mounted on the ends of said swingletree, the said hooks each having jaw members to receive a trace, and between which the end of the adjacent releasing lever is adapted to lockingly engage, and an operating arm connected with the toggle lever and operable to disengage the releasing levers from the jaw members of the hooks aforesaid.

6. A horse detacher comprising, in combination, a swingletree, a toggle lever mounted on said swingletree intermediate its ends, a releasing lever mounted adjacent to each end of the toggle lever, links connecting the ends of the toggle lever with one end of the releasing levers aforesaid, trace hooks carried by the ends of the swingletree, each having jaw members between which the free ends of the adjacent releasing lever is adapted to lockingly engage, and an operating arm connected to the toggle lever and adapted to impart break joint movement to the same to disengage the releasing levers from between the jaw members of the trace hooks and permit pivotal movement of the latter, the toggle lever, links and releasing levers aforesaid being arranged to move in the same plane.

In testimony whereof I affix my signature in presence of two witnesses.

GRANT HARER.

Witnesses:
L. B. CONGER,
ELMER A. SHIELDS.

Copies of this patent may be obtained for five cents each, by addressing the "Commissioner of Patents, Washington, D. C."